3,326,818
CATALYST COMPOSITION OF A CRYSTALLINE ALUMINOSILICATE AND A BINDER
Elroy Merle Gladrow and Warren Maxwell Smith, Baton Rouge, La., assignors to Esso Research and Engineering Company, a corporation of Delaware
No Drawing. Filed June 15, 1965, Ser. No. 464,224
18 Claims. (Cl. 252—455)

This invention relates to improved catalyst compositions, their preparation and use. More particularly, the invention is concerned with the preparation of catalysts comprising crystalline alumino-silicate zeolites and a binding agent, said catalysts exhibiting improved physical characteristics.

Crystalline alumino-silicate zeolites, commonly known as "molecular sieves," due to their ability to separate molecules on the basis of their size and shape arising out of their highly ordered crystalline structure and uniformly dimensioned pores, have been widely accepted adsorbent materials. Recently, considerable attention has been directed to the use of these materials as catalysts or catalyst supports. For example, in the petroleum industry, crystalline alumino-silicate zeolites have recently gained wide recognition as excellent hydrocarbon conversion catalysts and catalyst supports and have been found to possess excellent activity and selectivity characteristics. However, these crystalline materials, particularly when synthetically derived, are extremely finely divided, thereby creating the need for forming the fine zeolite crystals into agglomerates or particulate masses of a larger size either by pilling or pelleting under conditions of high pressure or by employing a suitable binder material to impart a sufficient degree of strength to the resulting masses. The present invention is directed to an improved method of preparing composites of crystalline alumino-silicate zeolites and inorganic binding agents, the composites thereby produced, and the use of such composites as hydrocarbon conversion catalysts. By means of the present invention, a crystalline zeolite composite is obtained which is readily amenable to extrusion or pelleting, which possesses sufficient strength for use in fluidized bed operations and especially fixed bed operations, and which has improved catalytic activity.

In accordance with one embodiment of the present invention, crystalline alumino-silicate zeolite composites are prepared by mixing crystalline alumino-silicate zeolite with a dry gel binding agent which contains a substantial amount of a peptizing agent, thereafter adding water to the resulting mixture in an amout just sufficient to produce a relatively viscous paste material, optionally heating said paste, drying the composite, and forming the composite into pellets or pills of the desired size. Alternatively, by adjusting the amount of water in the paste the mixture can be extruded prior to the drying step. The composite product is finally calcined at elevated temperatures.

It is recognized that prior art procedures have involved the mixing of various catalytically active materials with inorganic colloidal sols followed by drying of the mixture to form bonded materials. In these prior procedures, however, the binding agent has generally been in a relatively liquid state. For example, well known alumina bonding procedures usually involve the use of preformed alumina sol which typically has a solids content of about 5 to 7 wt. percent. Regardless of the solids content of the sols used, the amount of binding agent which can become incorporated into the ultimate product is necessarily limited by the particular solids content of the sol utilized. Thus, two alternatives are possible: (1) the active component can be added to the sol and then allowed to separate containing an imbibed quantity of the binding agent; or (2) the active component can be added to the sol and the total mixture dried to remove water. It will be observed that both alternatives are undesirable where the desired amount of binding agent exceeds the solids content of the colloidal sol. In the first alternative, a series of multiple treatments would be necessary to achieve the desired level of binding agent. In the second alternative, a large quantity of the colloidal sol would have to be used to achieve the desired level, thereby necessitating the evaporation of a correspondingly large volume of water. The present invention provides a distinct advantage over such procedures in that the desired amounts of the components of the ultimate composite product are dry mixed, with only a small amount of water being added to the mixture sufficient to provide a thick paste material. In this manner, a product having the desired end composition is almost directly prepared, thus enabling the preparation of any desired proportions of ingredients without multiple treatments and excessive intervening drying steps.

More specifically, the composite products of the invention will be prepared by dry mixing a major proportion of crystalline alumino-silicate zeolite and a minor proportion of a dry inorganic gel binding agent containing a minor amount of a peptizing agent. The term "peptizing agent," as used herein, is intended to mean an agent capable of reverting the solidified gel back to a colloidal suspension when the gel is contacted with water. Preferably, 51 to 95 wt. percent of the crystalline zeolite and 5 to 49 wt. percent of the binding agent based on the weight of the final dry composite will be utilized, and 5 to 25 wt. percent of peptizing agent based on the weight of the dry binding agent will be employed. The most preferred values of these ingredients will include 70 to 85 wt. percent of the crystalline zeolite and 15 to 30 wt. percent of the binding agent based on the weight of the final dry composite product, and 8 to 20 wt. percent of the peptizing agent based on the weight of the dry binding agent. The amount of water added to the dry mixture of crystalline zeolite and binding agent containing peptizing agent should be sufficient to form a thick viscous paste. Any additional amount of water is unnecessary and undesired owing to the excessive drying which would be required to form the final product. More specifically, the amount of water added can be such as to bring the total water content of the mixture to within the range of about 35 to 150 wt. percent, more preferably 55 to 125 wt. percent based on total weight of the two dry ingredients.

In general, the crystalline alumino-silicate zeolites within the purview of the present invention may be represented by the following formula, expressed in terms of moles:

$$0.9 \pm 0.2 \; M_{2/n}O : Al_2O_3 : XSiO_2$$

wherein M is selected from the group consisting of metal cations and hydrogen, $n$ is its valence, and X is a number from about 1.5 to about 12. The value of X will vary with the particular zeolite in question. Among the well-known natural zeolites are mordenite, faujasite, chabazite, gmelinite, analcite, erionite, etc. Such zeolites differ in structure, composition, and particularly in the ratio of silica to alumina contained in the crystal lattice structure; e.g. mordenite, having a ratio of about 8 to about 12; faujasite, having a ratio of about 2.5 to about 7; etc. Similarly, the various types of synthetic crystalline zeolites, e.g. faujasite, mordenite, etc. will also have varying silica to alumina ratios depending upon such variables as composition of crystallization mixture, reaction conditions, etc. U.S. Patents Nos. 3,013,982–86 describe a number of synthetic zeolites, designated therein as zeolites A, D, L, R, S, T, X and Y.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/ or silica sol; alkali metal oxide, e.g. sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product.

The zeolite which will be most preferred in the present invention is the synthetic faujasite variety, wherein X in the above formula is about 2.5 to 7, preferably 3 to 6, most preferably 4 to 5.5. It has a crystal structure very similar to the natural mineral faujasite and will usually have an average pore diameter of about 6 to 15, preferably 8 to 13, angstrom units. A conventional scheme for preparing synthetic sodium faujasite is as follows:

Colloidal silica or silica hydrosol is mixed with a solution of sodium hydroxide and sodium aluminate at ambient temperature. Suitable reactant molar ratios fall within the following ranges: $Na_2O/SiO_2$, 0.28 to 0.80; $SiO_2/Al_2O_3$, 4 to 40; $H_2O/Na_2O$, 15 to 60. The reaction mixture is preferably allowed to digest at ambient temperature for up to 40 hours or more, preferably 1 to 15 hours, or cooled to below about 80° F., in order to aid crystallization, and then heated to and held at about 180° to 250° F., e.g. 200° to 220° F., for a sufficient period to crystallize the product and to achieve maximum crystallinity, e.g. 24 to 200 hours or more, typically 50 to 100 hours. A crystalline hydrated sodium alumino-silicate zeolite having a faujasite structure is then separated from the aqueous mother liquor by decantation or filtration, washed, and dried to recover a crystalline product. It is then calcined at temperatures up to about 1000° F. in order to remove the water of hydration and thereby form interstitial channels which confer adsorptive and catalytic properties.

For application as a catalyst, the crystalline aluminosilicate zeolite is subjected to exchange with a metal cation or a hydrogen or hydrogen-containing cation capable of conversion to a hydrogen ion, or mixtures thereof, so as to reduce the zeolitic alkali metal content, e.g. sodium, to less than about 10 wt. percent (as $Na_2O$), preferably less than about 6 wt. percent ($Na_2O$), and most preferably to within the range of about 1 to 4 wt. percent ($Na_2O$) based on the zeolite crystals. It has been found that the alkali metal cations or oxides do not promote the desired hydrocarbon conversions and that beneficial effects on the catalytic properties of the zeolite are obtained when the alkali metal cation content is reduced to the range described. The metal cation suitable for ion exchange can be any cation of a metal of Groups I-B to VIII of the Periodic Table including the rare earth metals, but preferably is a polyvalent member of a group selected from Groups II, III, IV, V, VI-B, VII-B, VIII, the rare earth metals and mixtures thereof. Examples of metal cations suitable for use in the present invention are the following: aluminum; magnesium; calcium; barium; cadmium; rare earth metals, such as cerium, praseodymium, lanthanum, neodymium, and samarium; chromium; tungsten, cobalt, copper; iron; lead; lithium; manganese; nickel; silver; strontium; zinc; tin; platinum; palladium; molybdenum; vanadium; rhodium; and zirconium. Similarly, the alkali metal alumino-silicate can be converted to the hydrogen or acid form in which hydrogen ions occupy the former sites of the alkali metal cations. This may be effected by ion exchange with a hydrogen-containing cation such as a hydrogen cation or an ammonium cation. The ammonium-exchanged zeolite can be heated to expel ammonia and thereby leave a hydrogen cation in the exchanged site. When employing the zeolite catalyst for the cracking of hydrocarbons, it is generally preferred to exchange the alkali metal cations with alkaline earth metal cations, particularly magnesium or calcium, as well as aluminum or hydrogen cations and mixtures thereof.

The aforementioned ion exchange is effected by treatment of the zeolite with a suitable salt solution of the metal or hydrogen or hydrogen-containing cation at suitable temperature, e.g. 60–170° F. Suitable salt solutions useful in the ion-exchange treatment may include the sulfates, nitrates, chlorides, bromides, iodides, carbonates, thiocyanates, dithiocarbonates, acetates, benzoates, etc., of the aforementioned metals. The exchange solutions can contain a salt of a single metal, or mixtures of the above cations, or mixtures of the metallic cations with other type cations, such as the nonmetallic hydrogen ions or ammonium ions. Nonlimiting examples of some particularly desirable salt solutions are magnesium sulfate, calcium chloride, barium chloride, iron sulfate, ammonium chloride, ammonium sulfate, ammonium hydroxide, and ammonium nitrate, etc.

For use as a catalyst for hydrocracking, hydroisomerization, and the like, the above base-exchanged crystalline zeolite is composited with a suitable metallic hydrogenation component, preferably a platinum group metal. Alternatively, the base-exchanged zeolite can be first composited with the binding agent, the composite mixture calcined, and the latter combined with the metallic hydrogenation component. Addition of the hydrogenation component can be accomplished by treatment with an appropriate solution of the metals, such as a platinum group metal salt or ammonium complex solution, e.g. platinum tetramine dichloride; ammoniacal palladium chloride, etc. The amount of platinum group metal in the finished catalyst will ordinarily fall between about 0.01 and 5.0 wt. percent, preferably 0.1 to 3.0 wt. percent, based on the zeolite. By "platinum group metals" is meant metals in the platinum and palladium series of the Periodic System, such as platinum, palladium, rhodium, osmium, iridium, and the like. Palladium will be the preferred platinum group metal in the present invention. It will be preferred to reduce the platinum group metal, e.g. palladium, to its elemental form by treatment with a hydrogen-containing gas which is most conveniently accomplished after the catalyst is charged to the reactor. While platinum group metals will be preferred, it is within the contemplation of the present invention to employ other conventional hydrogenation components such as oxides or sulfides of cobalt, nickel, molybdenum, etc. or the reduced forms of these metals.

As an additional step in the preparation of the crystalline zeolite catalyst component, the zeolite is subjected to a calcination step at elevated temperature, e.g. about 400 to 1000° F., for several hours. This can be done after base exchange, before or after compositing the binding agent, and before or after impregnation with the hydrogenation metal component.

The inorganic gel binding agent can be any of the well-known materials used for the purpose of agglomerating small crystals into strong, attrition-resistant agglomerates. Representative materials include silica gel, alumina gel, silica-alumina gel, clays such as bentonite, montmorillonite, halloysite, kaolin and others. The preferred binding agents will be the inorganic gels, most preferably silica hydrogel and alumina gel, with alumina gel being especially preferred.

The peptizing agent which is included in the inorganic gel binding agent, e.g. alumina gel, can be added to a relatively pure gel. Where the alumina is separately treated with a peptizing agent, the peptizing treatment may consist, for example, of treating the alumina with a diluted solution of a weak acid and preferably an organic acid, such as formic, acetic, chloracetic, and the like. The alumina which is subjected to the peptizing treatment may be alumina gel, gelatinous alumina, or any of the commercial grades of alumina or aluminum hydrates. Such commercial grades of alumina include, for example, bauxite, activated alumina, or the like. The peptizing treatment can be accomplished by placing the alumina in a suitable mechanical mixer and then adding sufficient peptizing agent to thoroughly wet the mixture during the mixing operation. Sufficient peptizing agent will be added to result in a final product containing the aforementioned proportion of peptizing agent, e.g. 5 to 25 wt. percent. It should be noted that the amount of peptizing agent added in this instance is insufficient to completely revert the gel to a colloidal sol, but is sufficient to accomplish peptization upon subsequent addition of water to the mixture of the zeolite component and the gel component.

A more preferable alternative will be the inclusion of the peptizing agent directly in the preparation of the gel binding agent, so that it will already be present when combined with the zeolite. The following description will be directed to suitable procedures for preparing the preferred alumina gel containing peptizing agent. However, it will be understood that other inorganic gels can be employed as the binding agent component in the present invention. In the case of alumina gel, an alumia hydrosol is formed by any of the well-known techniques such as the so-called Patrick technique described, for example, in U.S. Patent 2,258,099. This technique involves reacting aluminum, preferably amalgamated with 0.05 to about 1 wt. percent mercury, or treated with other known accelerating agents such as iodine, with 10 to 100 parts by weight of an aqueous solution of acetic or formic acid of about 1 to 3% acid concentration at a temperature of about 80 to 160° F. The dilute acid solution reacts with a part of the amalgamated aluminum during the course of 10 to 48 hours to produce a hydrosol of alumina containing 1 to 3 or 5 wt. percent of alumina depending upon the amount and state of subdivision of the aluminum metal, the concentration of the acid solution, the temperature, and the time of contact. Alternatively, the alumina hydrosol can be prepared by the hydrolysis of aluminum alcoholate in acetic acid as described, for example, in U.S. 2,787,600. The alumina hydrosol which is preferably prepared in the presence of a peptizing agent such as the aforementioned acetic acid, is then dried such as by spray-drying or tray-drying and grinding to a fairly fine material, preferably 100 microns and smaller. The dried, finely divided gel will thus contain substantial residual peptizing agent; e.g. 5 to 25 wt. percent together with some residual moisture in the range of 10 to 25 wt. percent, all based on dry gel. It is this material, containing residual moisture and peptizing agent, which is dry mixed with the crystalline zeolite component to form the final bonded product of the invention.

The peptizing agents suitable for use in the present invention include the following: acetic acid, formic acid, propionic acid; glycolic acid; lactic acid, tartaric acid, aluminum chloride, aluminum bromide, ammonium nitrate, ammonium carbonate, chloracetic acid, and the like. Acetic acid and formic acid will be particularly preferred.

The crystalline alumino-silicate zeolite as hereinbefore described is mixed with the dried inorganic gel, e.g. alumina gel, containing the peptizing agent in conventional manner to achieve a fairly homogeneous admixture. At this point sufficient water is added to form a thick plastic mass or paste which can then be extruded into particles of any size. Alternatively, the well-mixed mixture can be pilled or pelleted by conventional means, under the pressure of which the alumina (containing moisture and peptizing agent) surprisingly reverts to a plastic, highly gelatinous mass and binds the finely divided crystalline alumino-silicate zeolite together. Subsequent calcination of these bonded extrudates or pellets at elevated temperatures, e.g. 800–1200° F. produces firm, mechanically strong and attrition resistant particles. By this technique, the hard, abrasive and finely divided crystalline alumino-silicate zeolite can be easily bonded together to produce finished pellets or extrudates of strength suitable for application as a catalyst in moving or fixed bed operations. At this point the catalyst can be composited with the hydrogenation component as previously described if the zeolite does not already contain the hydrogenation component at the time it is mixed with the dry gel.

It will be observed that the most preferred product produced by the process of the invention will consist of a crystalline alumino-silicate zeolite of the synthetic faujasite variety which has a silica to alumina ratio above about 3, and preferably 4 to 5.5, and uniform pore openings of about 6 to 15 A., which has been base exchanged to reduce its sodium content to below about 10 wt. percent, preferably 1 to 4 wt. percent, with a cation which is preferably a hydrogen-containing cation, a magnesium-containing cation or a mixture thereof, and which has composited therewith 0.1 to 3.0 wt. percent of a platinum group metal, preferably palladium; which zeolite has been bonded with a minor amount of alumina, e.g. 5 to 49 wt. percent, in accordance with the procedures hereinbefore set forth. This particular catalyst containing a platinum group metal is admirably suited for various hydrocarbon conversion processes, such as hydrocracking, hydroisomerization, etc. The advantages of the present invention will be particularly experienced in those processes employing fixed-bed operation wherein pellets of a certain minimal strength are required.

When the catalyst prepared by the above procedures is utilized for hydrocracking (in which case it will contain a hydrogenation component such as platinum group metal), any of the conventional hydrocracking feedstocks can be employed, such as virgin and catalytic naphthas, gas oils, cycle oils, heavy naphthas, residual fractions, crudes, etc. The hydrocracking process is carried out at typical temperatures of 450° to 1000° F., e.g. 450° to 750° F.; pressures of about 200 to 3000 p.s.i.g., preferably 1000 to 2000 p.s.i.g.; liquid hourly space velocities of about 0.1 to 10, preferably 0.5 to 3 volumes of feed per volume of catalyst per hour; and hydrogen rates of about 1000 to 25,000 preferably 2000 to 12,000, s.c.f./bbl. of feed. The catalyst may also be used for catalytic cracking processes, in which case the hydrogenation component will be excluded. The characteristics of catalytic cracking processes being so well known, they will not be described with any degree of particularity herein. However, suitable operating conditions will usually include a temperature of about 500 to 1200° F., preferably 750 to 1000° F.; pressures of about 0 to 500 p.s.i.g., preferably 0 to 200 p.s.i.g.; and a space velocity of 0.2 to 20, preferably 1 to 10, v./v./hr.

The invention will be further understood by reference to the following examples which are given for illustrative purposes only and are not intended to be limiting.

*Example 1*

A synthetic crystalline alumino-silicate zeolite having a crystal structure similar to the natural mineral faujasite, uniform pore openings of about 10–13 A., and a silica to alumina mole ratio of about 5, was base exchanged with a 31 wt. percent ammonium sulfate solution until its $Na_2O$ content had been reduced to 1.85 wt. percent. The product was oven dried and sized by passage through a 200 mesh screen.

In a separate vessel, an alumina sol was prepared by the hydrolysis of aluminum amylate in dilute acetic acid solution. An aluminum amylate solution containing 93 grams $Al_2O_3$/liter equivalent was fed at a rate of 1.5 liter/min. to a mixing zone where it was blended with a solution (comprising 30 parts of the alcoholate solvent and one part acetic acid) of the peptizing agent fed at a rate of 540 cc./min. The combined organic solution was then contacted in a mixing zone with water fed at a rate of 3.6 liter/min. The resulting organic phase was rejected and the aqueous phase heated to convert the alumina hydrate suspension to an alumina hydrosol containing about 30 grams $Al_2O_3$ per liter. The mole ratio of alumina (as $Al_2O_3$) to acetic acid in the sol is 4.5; on a weight basis the acetic acid is about 13% of the $Al_2O_3$.

The alumina sol prepared as above was then spray dried to form microspheres of alumina having a dry solids content of about 68.5 wt. percent and retaining about 8–11 wt. percent residual acetic acid based on dry solids which served as a peptizing agent in the subsequent preparation.

The dry ammonium faujasite (having a dry solids content of about 75 wt. percent) was dry mixed with the spray-dried alumina mircrospheres, in a proportion of 203 grams of faujasite to 61 grams of alumina, which on a bone-dry basis amounted to 150 grams of ammonium faujasite to 50 grams of alumina. The dry mixture containing 25 wt. percent of alumina was mixed by prolonged tumbling and then passed through a 100 mesh screen to further ensure good blending. 195 cc. of water was then added to the dry mixture at room temperature with mixing and a thick paste formed. This pasty mixture was then oven dried at 210° F. and thereafter ground in a mechanical mill into fine particles. A small sample of this ground product was heated for 16 hours at 1000° F. in ambient temperature air and analyzed for crystallinity by X-ray diffraction techniques.

The remainder of the ground, oven-dried, material was heated to 300° F. in an atomsphere of air and water vapor having a water vapor partial pressure of 0.15 atmosphere, and maintained at 300° F. for 16 hours, after which the temperature was raised at a rate of 75° F. per hour to 900° F. and maintained at 900° F. for an additional 16 hours. This material was then slowly cooled to 300° F. and removed from the heating unit. The aforementioned air-water vapor mixture was continually passed through the heating unit during the entire heating process. A sample of this material was also examined for crystallinity by X-ray diffraction techniques.

193 grams of the calcined material remaining was slurried in 430 cc. of a solution containing 0.965 gram palladium as $Pd(NH_3)_4Cl_2$. The suspension was stirred for 6 hours and then oven dried, after which the material was pelletized into cylindrical pellets and calcined for 16 hours at 1000° F. in ambient air. The product was designated "Catalyst A," and a sample was analyzed for crystallinity by X-ray diffraction techniques.

The crystallinity measurements for these three samples are shown below:

TABLE I

Percent crystallinity [1]
Heated originally at 1000° F. in ambient air _____ 121
Calcined at 900° F. in air-water atmosphere _____ 126
Impregnated with 0.5% Pd, pelleted, heated at 1000° F. _____ 123

[1] Compared to a pure Na-faujasite preparation taken as 100%.

It will be observed that the catalyst of the invention is extremely resistant to degradation of crystal structure by extreme environmental changes.

EXAMPLE 2

The pill strength of Catalyst "A" of Example 1 was compared with two other commercially available catalysts, designated "Catalyst B" and "Catalyst C."

Catalyst "B" was a similar synthetic faujasite-based catalyst containing 0.5 wt. percent palladium which had been base-exchanged with both ammonium ions and magnesium ions, the magnesium being used to impart a greater degree of stability to the zeolite. This catalyst is available commercially in the form of self-bonded cylindrical pellets, of a size ⅛ x ⅛″, i.e., it contains no added bonding agent. After calcining at 1000° F. it showed a relative crystallinity of 122%.

Catalyst C consisted of a zeolite component essentially similar to that of Catalysts A and B which was mixed with a silica-stabilized alumina containing 5 wt. percent $SiO_2$ and 95 wt. percent $Al_2O_3$, in the ratio of 4 parts zeolite to 1 part alumina by weight. It contained 0.5% palladium. The catalyst was pelleted into ⅛ x ⅛″ cylinders. After calcining at 1000° F. it showed a relative crystallinity of 119%.

Portions of the Catalysts A, B, and C pellets were tested for their crushing strength after a number of pretreatment procedures: (1) calcination for 16 hours at 1000° F.; (2) calcination at 1000° F., followed by soaking in normal hexane for 16 hours followed by drying in ambient temperature air; and (3) calcination at 1000° F. soaking the pellets in water for 16 hours, drainage of water, and oven-drying at 300° F. At the end of each separate pretreatment, a sampling of individual pellets from each catalyst charge was chosen at random and measured for pill strength by compressing a cylindrical pellet at least ¼″ long on its curved side under a slowly increasing pressure. The pressure applied at the time the pellet cracked was recorded. This test is applicable to extruded pellets as well as shaped pills. The maximum capacity of the apparatus utilized was 52 lbs. The results are summarized in the following table:

TABLE II

| Catalyst | A | B | C |
|---|---|---|---|
| Pill size, inches | 3/16 x ⅛ | ⅛ x ⅛ | ⅛ x ⅛ |
| Bonding Agent | 25% $Al_2O_3$ | None | 20% Stabilized $Al_2O_3$ |
| Peptizing Agent | Yes | No | No |
| Calcined at 1,000° F.: | | | |
| Number pills crushed | 13 | 20 | 20 |
| Number pills uncrushed (>52 lbs.) | 7 | 0 | 0 |
| Average pill strength, lbs | 42.8 | 28.0 | 31.9 |
| Hexane immersed: | | | |
| Number pills crushed | 13 | 20 | 20 |
| Number pills uncrushed (>52 lbs.) | 7 | 0 | 0 |
| Average pill strength, lbs | 39.9 | 4.6 | 12.7 |
| Hydrated and recalcined: | | | |
| Number pills crushed | 13 | 20 | 20 |
| Number pills uncrushed (>52 lbs.) | 7 | 0 | 0 |
| Average pill strength, lbs | 45.4 | 17.3 | 32.1 |

It is evident from the above data that the catalyst of the invention, i.e., Catalyst A, exhibits substantially greater pill strength than the other two conventional commercial catalysts. In each instance, Catalyst A exhibited a significantly higher pill strength, and a significantly lower proportion of pills susceptible to crushing in the testing apparatus. It should be noted that the average pill strengths indicated for Catalyst A after each pretreatment are fictitiously low, since an arbitrary value of 52 lbs. was assigned for each of the 35% of the pills which remained uncrushed. Thus, by the technique of the present invention, a remarkable pill strength can be achieved.

EXAMPLE 3

A catalyst of the invention designated "Catalyst D" was prepared by dry blending an ammonium faujasite similar to the ammonium faujasite prepared in Example 1 and used as the zeolite component of Catalyst A, and a commercially available fibrillar colloidal boehmite which contained 9.8% acetate as acetic acid. On a dry basis, 150 grams of faujasite and 50 grams of boehmite were blended, and the mixture was passed through a 100 mesh screen. Upon addition of 207 cc. of water, with mixing, a thick pasty mixture formed. This pasty mixture was oven-dried at 220° F., and the oven-dried material was ground and calcined at 900° F. in an air-water vapor atmosphere as in Example 1. The calcined material was then immersed in a solution containing sufficient palladium as $Pd(NH_3)_4Cl_2$ to incorporate 0.5% palladium in the finished catalyst. After oven-drying, the material was pelleted into 3/16″ x ⅛″ pellets and exhibited a crystallinity of 98% as compared to the pure sodium faujasite preparation.

EXAMPLE 4

Samples of Catalysts A, B, C, and D were steam-treated at 1200° F., atmospheric pressure, for 16 hours. After the steam treatment, measurements were taken of the faujasite crystallinity and the degree of palladium-palladium oxide agglomeration. Loss of zeolite crystallinity is an indication of a severe loss in catalytic activity and selectivity. Agglomeration of palladium-palladium oxide leads to poor catalyst activity and stability. This agglomeration in the presence of water vapor results in the formation of local concentrations of hydrogenation component as opposed to the ideal situation wherein the metal is highly dispersed over the catalytic surfaces of the zeolite. The results of these measurements are indicated in the following table:

TABLE III

| Catalyst | A | B | C | D |
|---|---|---|---|---|
| Percent original crystallinity retained | 84 | 66 | 75 | 87 |
| Percent Pd-PdO agglomerates after steaming | 24 | 118 | 47 | 76 |

As shown by the above data, Catalysts A and D, which are catalysts of the invention, exhibited superior retention of crystallinity than Catalysts B and C, when subjected to severe steaming conditions. The resistance to agglomerate formation of Catalyst A is indicated to be outstanding.

EXAMPLE 5

The hydrocracking activity of Catalysts A and B were evaluated using a hydrofined light catalytic cycle oil feed stock with the following inspections:

Gravity, API _____ 39.3
Sulfur, p.p.m. _____ 15
Nitrogen, p.p.m. _____ 1
ASTM distillation, ° F.:
   Initial B.P. _____ 428
   5% off at _____ 450
   90% off at _____ 662
   95% off at _____ 702
   Final B.P. _____ 731

Each catalyst was calcined for 16 hours at 1000° F. in an atmosphere of flowing dry air. After cooling, the catalyst was blanketed with nitrogen and transferred to a hydrocracking reactor at room temperature. The nitrogen was displaced with hydrogen while the pressure in the reactor was increased to 1500 p.s.i.g. The temperature of the reactor was then increased to 700° F. at a rate of 70° F./hr., held at 700° F. for 16 hours, and then cooled to 465° F. at which point feed was introduced. After 310 hours of operation, the run was terminated. Activity factors for the catalysts were determined using mathematical expression which takes into account feed rate (as v./v./hr.), conversion level, temperature, added inlet gas rate and pressure, and a factor dependent on the composition and boiling range of the feed. The value for each catalyst is based on a conversion level of 50 wt. percent. A comparison of the activity factors of these two catalysts is shown in the following table:

TABLE IV

| Catalyst | A | B |
|---|---|---|
| Percent Pd | 0.5 | 0.5 |
| Percent Faujasite | 75 | 100 |
| Activity Factor: | | |
|   Initial | 12 | 28 |
|   After 310 hours | 11 | 12 |

It is evident from the above data that the catalyst of the invention, i.e., Catalyst A, exhibited very little, if any, activity loss over the 310-hour run, although its activity was initially lower than the pure faujasite Catalyst B. Catalyst "B," on the other hand, which was not prepared by the process of the invention, exhibited a marked reduction in activity over the 310-hour period, so that at this point the two catalysts were essentially equivalent activity-wise. It should be particularly observed that Catalyst A contained only 75% of the active zeolite component, where Catalyst B consisted of 100% of the zeolite component, so that the equivalence in activity between the two catalysts at the 310-hour period indicates a decided advantage for the use of Catalyst A.

EXAMPLE 6

810 grams of the oven-dried ammonium form faujasite (600 grams dry basis) as described in Example 1, containing 1.85 wt. percent residual soda was dry-mixed with 310 grams spray-dried alcoholate alumina (200 grams dry basis) made as described in Example 1. The two materials were well mixed by tumbling and finally passed through a 100-mesh screen to ensure homogenization. 200 cc. $H_2O$ were added to the mixture to make a plastic mass which was then fed to an extruder (California Pellet Mill) to make ⅛″ diameter extruded pellets. The pellets were heated in air for 16 hours at 300° F., and then the temperature was raised to 1000° F. at the rate of 90° F./hr. in an atmosphere of air and water vapor (0.15 atm. partial pressure). Heating was continued at 1000° F. in the wet atmosphere for an additional 16 hours, following which the pellets were then cooled. 51 grams of the calcined pellets were soaked in 113 cc. of a solution comprising 255 mg. palladium as $Pd(NH_3)_4Cl_2$ for 65 hours. The excess liquid was decanted and the pellets oven dried. This material, which contained 0.5% Pd on a base of 3 parts hydrogen form faujasite and 1 part $Al_2O_3$, is designated Catalyst "E" in the subsequent example.

EXAMPLE 7

The hydrocracking activities of commercial alumina bonded Catalyst C, and Catalyst E of the invention, were evaluated using the hydrofined light catalytic cycle oil described in Example 5. The catalysts were each calcined for 16 hours at 1000° F. in dry air, cooled, blanketed with nitrogen and transferred to the hydrocracking reactor at room temperature. The nitrogen was displaced with hydrogen while the pressure was raised in the reactor to 1500 p.s.i.g. The temperature of the reactor was then raised to 700° F. at a rate of 70° F./hr., held at 700° F. for 16 hours, and then cooled at 465° F., at which point the oil feed was introduced. At the end of 97 hours of operation, the catalysts had each reached steady state performance, with the following results:

TABLE V

| Catalyst | C | E |
|---|---|---|
| Average Catalyst Temperature, ° F | 508 | 510 |
| Feed Rate, v./v./hr. | 1.0 | 1.0 |
| Conversion, vol. percent 400° F. and lighter | 46 | 75 |
| Activity Factor | 18 | 31 |

These data attest to the superior performance of the catalysts of the invention over the commercial alumina bonded catalyst of similar nominal composition.

What is claimed is:
1. A catalytic composition comprising a major proportion of a crystalline alumino-silicate zeolite and a minor proportion of an inorganic gel binder, said binder containing a minor amount of a peptizing agent said catalyst composition having been prepared by dry mixing a crystalline alumino-silicate zeolite and a dry inorganic gel binder containing a peptizing agent, converting said inorganic gel binder to a sol in the form of a thick plastic mass and further drying said mass whereby a solid catalyst composite is produced which has superior catalytic activity, mechanical strength and physical stability.

2. The composition of claim 1 containing about 51 to 95 wt. percent of said zeolite and about 5 to 49 wt.

percent of said binder, and about 5 to 25 wt. percent of said peptizing agent based on the weight of the binder.

3. The composition of claim 1, wherein said binder is alumina.

4. The composition of claim 1 which additionally comprises a hydrogenation component.

5. The composition of claim 2, wherein said zeolite has a crystal structure essentially similar to that of the mineral faujasite.

6. The composition of claim 5, wherein said zeolite has uniform pore openings between about 6 and 15 angstrom units and a silica to alumina mole ratio above about 3.

7. The composition of claim 6, wherein said zeolite contains less than about 10 wt. percent sodium oxide by virtue of its having been base-exchanged with a metal cation or a hydrogen or hydrogen-containing cation.

8. A method of preparing a catalyst composition comprising a major proportion of a crystalline alumino-silicate zeolite and a minor proportion of an inorganic gel binder, which method comprises dry mixing said proportions of zeolite and dry binder, said binder containing a minor amount of peptizing agent, and forming said admixture into pellets of a desired size and shape utilizing sufficient pressure to convert said mixture to a plastic, highly gelatinous mass during said forming step.

9. The method of claim 8, wherein said binder is alumina.

10. The method of claim 8, wherein said major proportion is in the range of about 70 to 85 wt. percent, said minor proportion is in the range of about 15 to 30 wt. percent, and said minor amount is in the range of about 8 to 20 wt. percent based on the weight of said binder.

11. The method of claim 8, wherein said zeolite contains a hydrogenation component.

12. The method of claim 9 which additionally comprises incorporation of a hydrogenation component into said catalyst composition.

13. A method of preparing a catalyst composition comprising a major proportion of a crystalline alumino-silicate zeolite and a minor proportion of an inorganic gel binder, which method comprises dry mixing said proportions of zeolite and dry binder, said binder containing a minor amount of peptizing agent, adding an amount of water to said admixture sufficient to form a paste, forming said paste into particulate masses of a desired size and shape, and calcining said masses.

14. The method of claim 13, wherein said binder is alumina.

15. The method of claim 13, wherein said major proportion is in the range of about 70 to 85 wt. percent, said minor proportion is in the range of about 15 to 30 wt. percent, and said minor amount is in the range of about 8 to 20 wt. percent based on the weight of said binder.

16. The method of claim 13, wherein said zeolite contains a hydrogenation component.

17. The method of claim 13, which additionally comprises incorporation of a hydrogenation component into said catalyst composition.

18. The method of claim 13, wherein said zeolite contains less than about 10 wt. percent sodium oxide by virtue of its having been base-exchanged with a metal cation or a hydrogen or hydrogen-containing cation.

References Cited
UNITED STATES PATENTS

| | | | |
|---|---|---|---|
| 2,371,237 | 3/1945 | Heard et al. | 208—135 |
| 3,140,253 | 7/1964 | Plank et al. | 208—120 |

DELBERT E. GANTZ, *Primary Examiner.*

ABRAHAM RIMENS, *Examiner.*